(12) United States Patent
Graham et al.

(10) Patent No.: US 10,677,240 B2
(45) Date of Patent: Jun. 9, 2020

(54) METHOD FOR REMANUFACTURING FLUID END BLOCK

(71) Applicant: Caterpillar Inc., Peoria, IL (US)

(72) Inventors: Curtis J. Graham, Peoria, IL (US); Christopher A. Kinney, Iuka, MS (US)

(73) Assignee: Caterpillar Inc., Peoria, IL (US)

( * ) Notice: Subject to any disclaimer, the term of this patent is extended or adjusted under 35 U.S.C. 154(b) by 182 days.

(21) Appl. No.: 15/812,454

(22) Filed: Nov. 14, 2017

(65) Prior Publication Data

US 2019/0145400 A1 May 16, 2019

(51) Int. Cl.
*F04B 47/00* (2006.01)
*B23P 6/04* (2006.01)
(Continued)

(52) U.S. Cl.
CPC .............. *F04B 47/00* (2013.01); *B23P 6/04* (2013.01); *F04B 1/0404* (2013.01);
(Continued)

(58) Field of Classification Search
CPC ...... F04B 47/00; F04B 1/0404; F04B 53/007; F04B 1/0538; F04B 53/16; F04B 19/22;
(Continued)

(56) References Cited

U.S. PATENT DOCUMENTS 3,786,729 A * 1/1974 Rizzone ................ F04B 53/162
92/171.1

3,806,693 A * 4/1974 Miller ................... B23K 15/04
219/121.13
(Continued)

FOREIGN PATENT DOCUMENTS

CN 202833082 3/2013
CN 103835937 6/2014
(Continued)

OTHER PUBLICATIONS

Author: Mark Nowell, The 5 Failures of Fluid Ends, Magazine, Fall 2016 Issue Publication, Oct. 18, 2016, http://www.upstreampumping.com/article/well-completion-stimulation/2016/5-failures-fluid-ends, Birmingham.

*Primary Examiner* — Sarang Afzali
(74) *Attorney, Agent, or Firm* — Hibshman Claim Construction PLLC

(57) ABSTRACT

A method for remanufacturing a fluid end block of pump. The fluid end block includes a first bore defining a first longitudinal axis, a second bore defining a second longitudinal axis and a third bore defining a third longitudinal axis. The method includes enlarging, by a machining process, the first bore to a first predetermined dimension, the second bore to a second predetermined dimension and the third bore to a third predetermined dimension, inserting a first insert into the enlarged first bore and coupling the first insert to the fluid end block, the first insert having a first slot and a second slot, inserting a second insert into the enlarged second bore such that the second insert is at least partially received within the first slot and inserting a third insert into the enlarged third bore such that the third insert is at least partially received within the second slot.

7 Claims, 15 Drawing Sheets

(51) Int. Cl.
*F04B 19/22* (2006.01)
*F04B 53/16* (2006.01)
*F04B 53/00* (2006.01)
*F04B 1/0404* (2020.01)
*F04B 1/0538* (2020.01)

(52) U.S. Cl.
CPC ............ *F04B 1/0538* (2013.01); *F04B 19/22* (2013.01); *F04B 53/007* (2013.01); *F04B 53/16* (2013.01); *Y10T 29/49238* (2015.01); *Y10T 29/49734* (2015.01)

(58) Field of Classification Search
CPC ........ B23P 6/04; B23P 6/00; Y10T 29/49233; Y10T 29/49238; Y10T 29/49718; Y10T 29/49732; Y10T 29/49734; Y10T 29/49735; Y10T 29/49737; Y10T 29/49739; Y10T 29/49742
See application file for complete search history.

(56) References Cited

U.S. PATENT DOCUMENTS

| | | | | |
|---|---|---|---|---|
| 7,934,303 | B2* | 5/2011 | Awwad | F04B 27/0834 29/402.04 |
| 10,288,178 | B2* | 5/2019 | Nowell | F16K 5/0464 |
| 10,400,628 | B2* | 9/2019 | Beers | B23P 6/04 |
| 2008/0226414 | A1* | 9/2008 | Schultz | F16B 37/125 411/110 |
| 2011/0308967 | A1 | 12/2011 | Byrne | |
| 2016/0032701 | A1* | 2/2016 | Young | F04B 53/168 417/437 |
| 2016/0312808 | A1 | 10/2016 | Morreale et al. | |

FOREIGN PATENT DOCUMENTS

| | | |
|---|---|---|
| CN | 104747430 | 7/2015 |
| CN | 105221407 | 1/2016 |

* cited by examiner

METHOD FOR REMANUFACTURING FLUID END BLOCK

TECHNICAL FIELD

The present disclosure generally relates to a fluid end block of a pump. More particularly, the present disclosure relates to a method for remanufacturing and repairing the fluid end block of the pump.

BACKGROUND

Well stimulation pumps are generally used in oil and petroleum industry to assist in the removal of hydrocarbons from the earth. Generally, a well stimulation pump includes a number of bores. Such bores may be configured to produce a pressurized fluid. For example, a pressure of such fluids may be of a magnitude of more than 6000 pounds per square inch. Further, the pressure of the fluid may even be cyclical or periodic in nature.

Such fluid may interact with internal surfaces of the bores of the fluid end block, and, over a period, may cause a wearing of the internal surfaces. In some cases, the interaction may even lead to formation of cracks on the fluid end block. The presence of cracks in the fluid end block and/or the worn internal surfaces may require a replacement of the fluid end block.

US Patent Publication 2011/0308967 (hereinafter referred to as US 2011/0308967) relates to a fluid end block of a pump and in particular to a sacrificial body that mitigates pitting and corrosion of the fluid end block. US 2011/0308967 discloses a pump having a fluid end block. The fluid end block includes a plunger bore. A sacrificial body, i.e. a sleeve, is mounted/placed within the plunger bore of the fluid end block. A plunger is received within the sacrificial body. The sacrificial body is worn as the pump is operated rather than the fluid end block.

SUMMARY OF THE INVENTION

In an aspect of the present disclosure, a method for remanufacturing a fluid end block of a pump is disclosed. The fluid end block includes a first bore defining a first longitudinal axis, a second bore defining a second longitudinal axis and a third bore defining a third longitudinal axis. The method includes enlarging, by a machining process, the first bore to a first predetermined dimension, the second bore to a second predetermined dimension and the third bore to a third predetermined dimension. The method further includes inserting a first insert into the enlarged first bore and coupling the first insert to the fluid end block, the first insert having a first slot and a second slot. The method further includes inserting a second insert into the enlarged second bore such that the second insert is at least partially received within the first slot and inserting a third insert into the enlarged third bore such that the third insert is at least partially received within the second slot.

In another aspect of the present disclosure, a fluid end block of a pump is disclosed. The fluid end block includes a first bore having a first longitudinal axis, a second bore having a second longitudinal axis and a third bore having a third longitudinal axis. The fluid end block is remanufactured by a process including the steps of enlarging, by a machining process, the first bore to a first predetermined dimension, the second bore to a second predetermined dimension and the third bore to a third predetermined dimension. The process further includes the step of inserting a first insert into the enlarged first bore and coupling the first insert to the fluid end block, the first insert having a first slot and a second slot. The process also includes the steps of inserting a second insert into the enlarged second bore such that the second insert is at least partially received within the first slot and inserting a third insert into the enlarged third bore such that the third insert is at least partially received within the second slot.

DETAILED DESCRIPTION

Reference will now be made in detail to embodiments of the disclosure, examples of which are illustrated in the accompanying drawings. Wherever possible, the same reference numbers will be used throughout the drawings to refer to the same or like parts.

Figure 1:
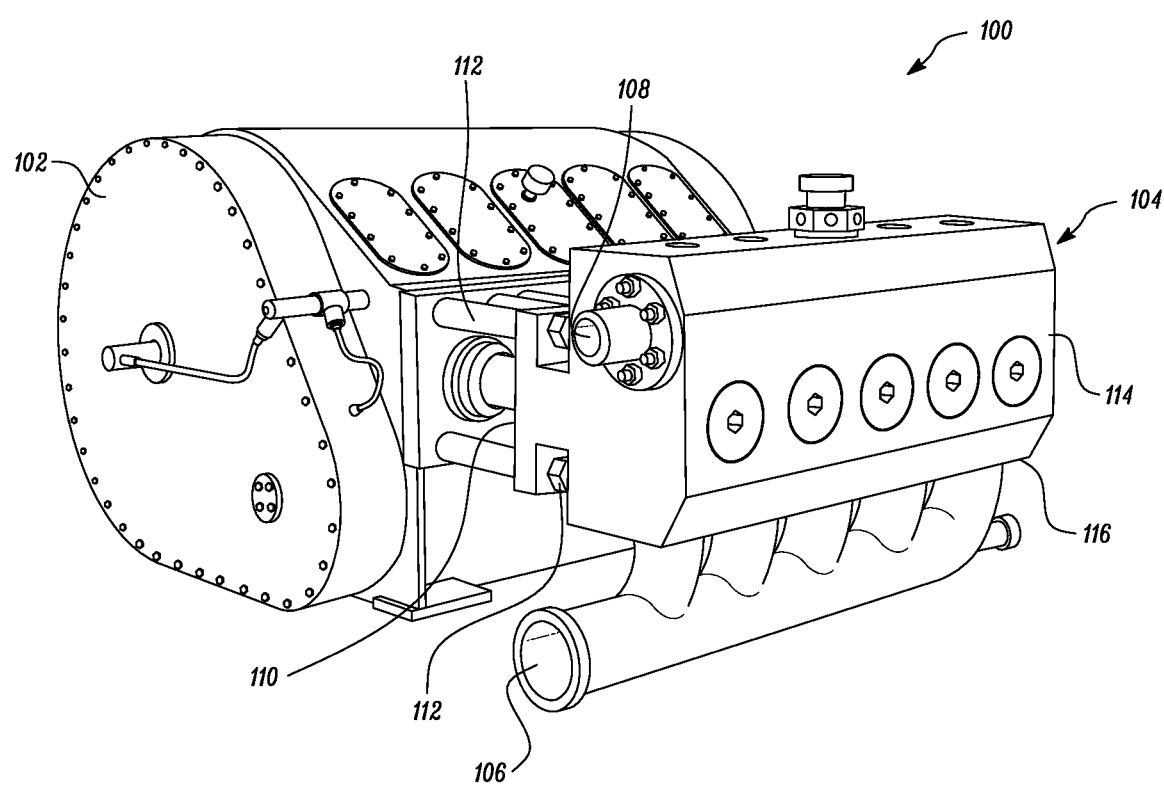
FIG. 1 is a perspective view of a well stimulation pump, in accordance with an embodiment of the present disclosure.

Referring to FIG. 1, an exemplary pump 100 is disclosed. In the embodiment illustrated, the pump is a well stimulation pump 100. The well stimulation pump 100 includes a power end 102, a pump body having a fluid end block 104, an inlet 106 and an outlet 108. The power end 102 is coupled to the fluid end block 104. The power end 102 is driven by an external power source (not shown), which allows the well stimulation pump to draw water and other ingredients (i.e. fracking fluid) from a reservoir via the inlet 106 into the fluid end block 104.

Figure 2:
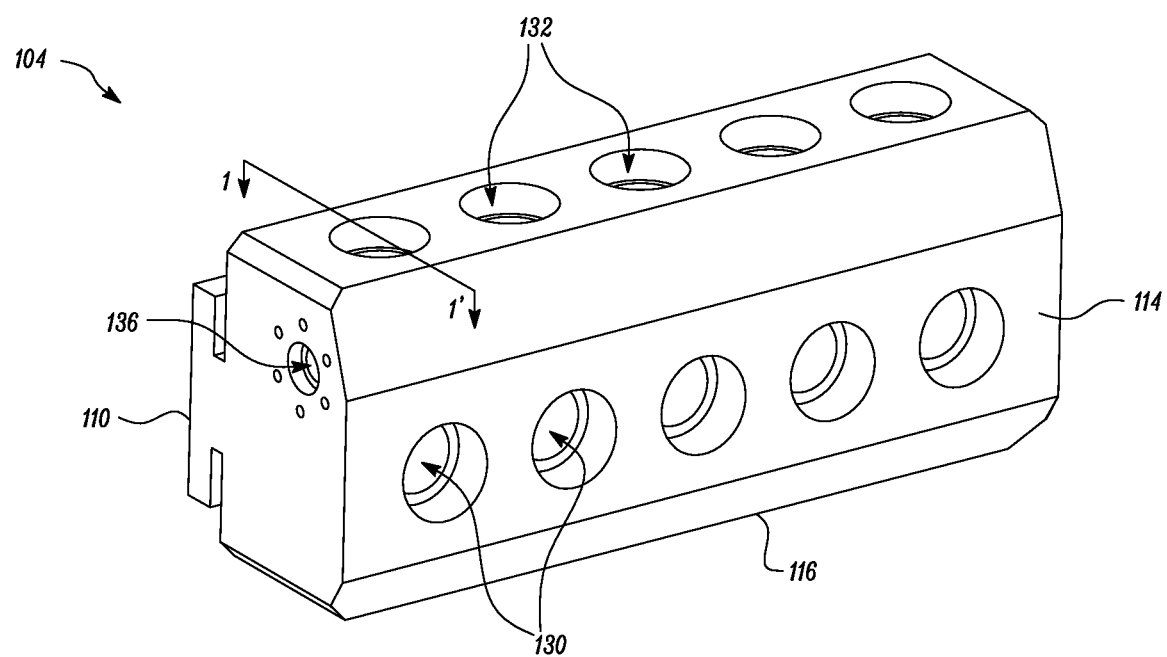
FIG. 2 is a perspective view of a fluid end block of the well simulation pump, in accordance with an embodiment of the present disclosure.

The fluid end block 104 may be an elongated structure, as shown in FIG. 2 that includes a plurality of external surfaces. For example, the fluid end block 104 includes a mounting surface 110 that may be used to directly secure the fluid end block 104 to the power end 102 by a plurality of bolts 112. The fluid end block 104 further includes a first block surface 114 and a second block surface 116. The fluid end block 104 may be formed from a high strength steel via a forging process. In alternate embodiments, the fluid end block 104 may be formed of any other material known in the art via alternate manufacturing process such as casting, additive manufacturing, etc.

Figure 3:
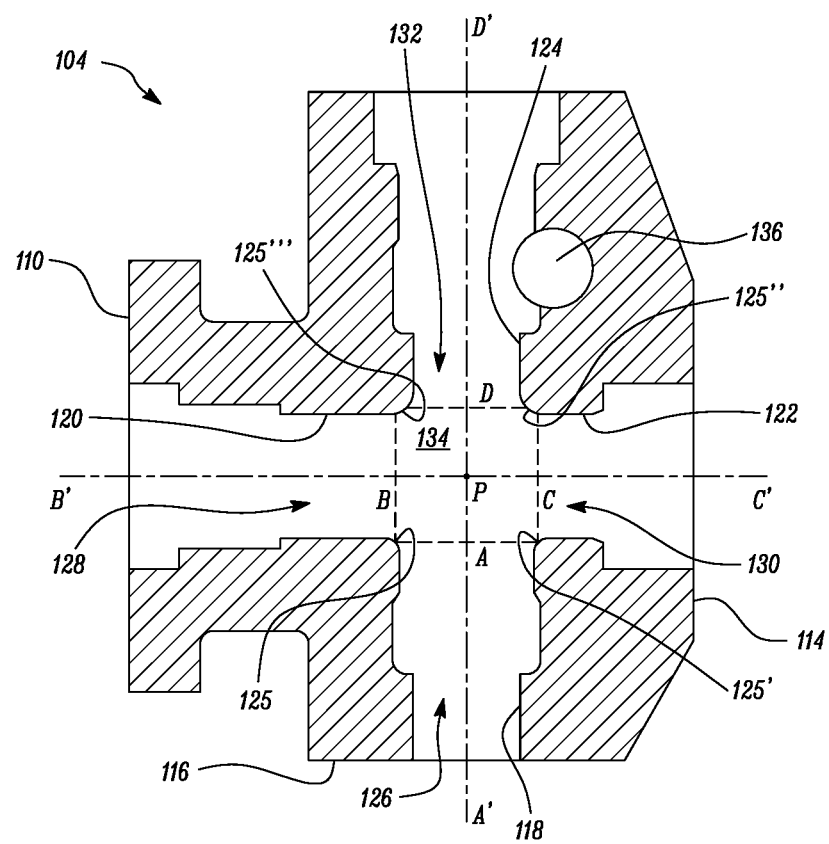
FIG. 3 illustrates a cross sectional view of the fluid end block in an undamaged condition, in accordance with an exemplary embodiment of the present disclosure.

The fluid end block 104 also includes a set of internal surfaces and a plurality of bores that will now be explained with reference to FIG. 3. FIG. 3 illustrates a cross section of the fluid end block 104 along a plane passing through the line 1-1'. Further, FIG. 3 presents the features of the fluid end block 104 in an undamaged condition.

As shown in the cross-sectional view of FIG. 3, the fluid end block 104 includes a first internal surface 118, a second internal surface 120, a third internal surface 122 and a fourth internal surface 124. The first internal surface 118 defines a first bore 126 having a first longitudinal axis A-A'. The second internal surface 120 defines a second bore 128 having a second longitudinal axis B-B'. The third internal surface 122 defines a third bore 130 having a third longitudinal axis C-C'. The fourth internal surface 124 defines a fourth bore 132 having a fourth longitudinal axis D-D'. The fluid end block 104 further includes a common volume chamber 134 that fluidly couples the bores (i.e. first bore 126, second bore 128, third bore 130 and fourth bore 132) with each other. The first bore 126 may extend from the second block surface 116 to the common volume chamber 134. The second bore 128 may extend from the mounting surface 110 to the common volume chamber 134. The third bore 130 may extend from the first block surface 114 to the common volume chamber 134.

The fluid end block 104 may further include shoulders 125, 125', 125" and 125'". The shoulder 125 corresponds to a portion of the fluid end block 104 where the first internal surface 118 intersects/meets the second internal surface 120. The shoulder 125' corresponds to a portion of the fluid end block 104 where the first internal surface 118 intersects/meets the third internal surface 122. Similarly, the shoulder 125" corresponds to a portion of the fluid end block 104 where the third internal surface 122 intersects/meets the fourth internal surface 124 and the shoulder 125'" corresponds to a portion of the fluid end block 104 where the second internal surface 120 intersects/meets the fourth internal surface 124.

In the embodiment illustrated in FIG. 3, the first longitudinal axis A-A', the second longitudinal axis B-B', the third longitudinal axis C-C' and the fourth longitudinal axis D-D' intersect at a common point P. Further, in the embodiment illustrated in FIG. 3, the first longitudinal axis A-A', the second longitudinal axis B-B', the third longitudinal axis C-C' and the fourth longitudinal axis D-D' are coplanar. In the embodiment illustrated, the first longitudinal axis A-A' and the second longitudinal axis B-B' are perpendicular to the third longitudinal axis C-C' and the fourth longitudinal axis D-D'.

As mentioned above, FIG. 3 illustrates a cross-sectional view of the fluid end block 104 along a plane passing through line 1-1' (shown in FIG. 2). Such a view depicts only one first bore 126, second bore 128, third bore 130 and fourth bore 132. However, it may be appreciated that the fluid end block 104 includes multiple first bores 126, second bores 128, third bores 130 and fourth bores 132 (as is evident from the illustration of FIG. 2).

Each bore i.e. the first bore 126, the second bore 128, the third bore 130 and the fourth bore 132 in the fluid end block 104 is configured to receive a component or a fluid or perform a certain function. For example, the second bore 128 is configured to receive a plunger/piston of the power end 102 that reciprocates and produces a suctioning force within the fluid end block 104. The suctioning force sucks the fracking fluid from a reservoir (via the inlet 106) into the first bore 126 and subsequently into the common volume chamber 134 of the fluid end block 104. The common volume chamber 134 serves as volume where the fracking fluid is pressurized (due to the action of the reciprocating plungers/pistons). Subsequent to being pressurized, the fracking fluid in the common volume chamber 134 is then passed to the fourth bore 132. The fourth bore 132 is fluidly coupled to a common internal high pressure discharge passage 136 (present in the fluid end block 104) which serves as a passageway to transmit the pressurized fracking fluid from the fourth bore 132 to the high pressure outlet 108.

Figure 4:
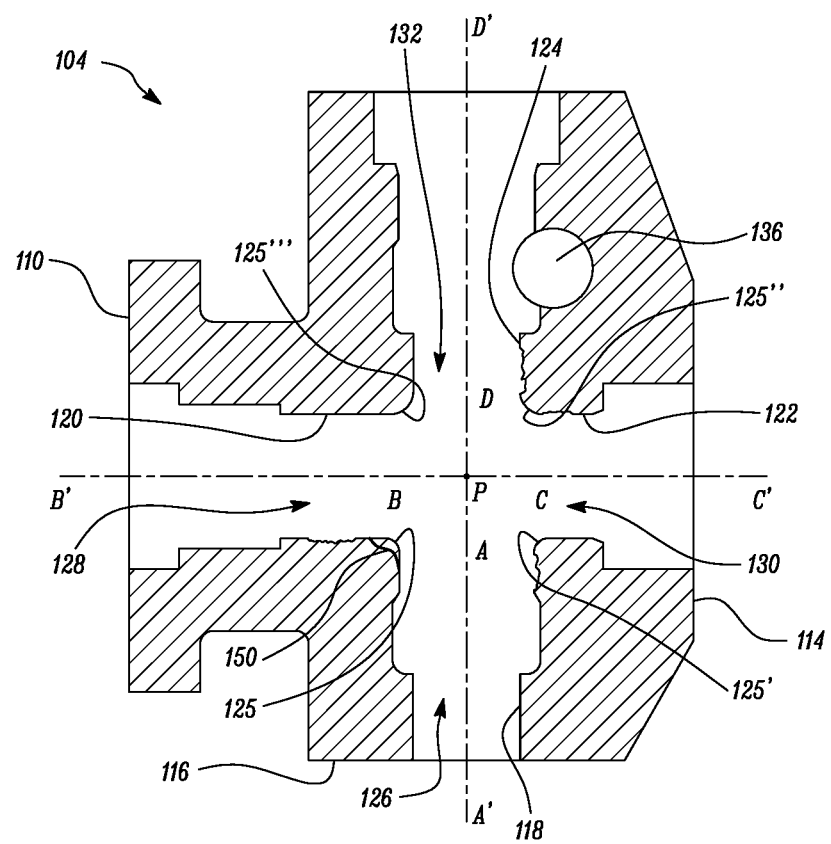
FIG. 4 illustrates a cross sectional view of the fluid end block in a damaged condition, in accordance with an exemplary embodiment of the present disclosure.

During the abovementioned operation of the well simulation pump 100, the pressure of the fracking fluid may cause a wearing of the internal surfaces (i.e. the first internal surface 118, second internal surface 120, third internal surface 122 and fourth internal surface 124) of the fluid end block 104, as shown in FIG. 4. The interaction between the fracking fluid and the internal surfaces may also lead to damage and erosion on the corners/shoulders 125, 125', 125" and 125'". In some cases, the interaction between the fracking fluid and the internal surfaces may also lead to formation of cracks such as a crack referred to by the reference numeral 150 on the internal surfaces and/or the shoulder 125 of the fluid end block 104. Such damage may render the fluid end block 104 unable to perform its intended operations and may require replacement of the fluid end block 104. In an aspect of the present disclosure, a component set 135 (portions of which are shown in FIG. 5, FIG. 7, FIG. 8, FIG. 21, FIG. 22 and FIG. 23) used to remanufacture the fluid end block 104 is disclosed. The component set 135 includes a first insert 142, a second insert 168 and a third insert 178.

Figure 5:
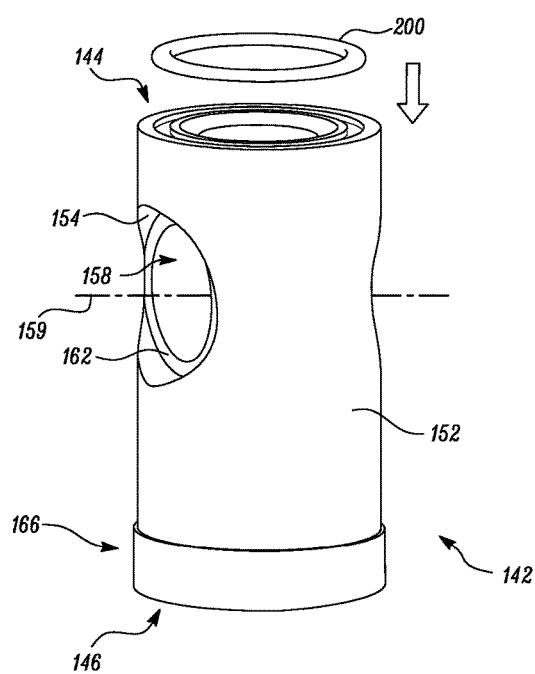
FIG. 5, FIG. 6, FIG. 7 and FIG. 8 illustrate a first insert, a second insert and a third insert configured to be placed in the fluid end block, in accordance with an embodiment of the present disclosure.
Figure 6:
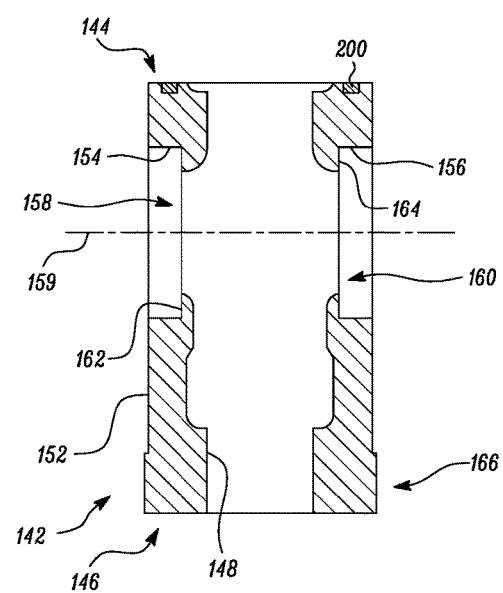

The first insert 142 is a hollow elongated structure. More specifically, the first insert 142 is a hollow cylindrical structure, as shown in FIG. 5 and FIG. 6. The first insert 142 may be composed of stainless steel, Inconel®, Incoloy®, and/or other metal and alloys exhibiting suitable corrosion and erosion resistance and strength. If desired, coatings and surface treatments may be applied to the surfaces of the first insert 142 to improve the corrosion and erosion characteristics thereof.

The first insert 142 includes a first end 144 and a second end 146. The first insert 142 may be designed/fabricated such that an internal profile of the first insert 142 is similar to an internal profile of the first bore 126 in an undamaged condition (the similar internal profiles can be seen by comparing FIG. 3 and FIG. 6).

Referring to FIG. 5 and FIG. 6, the first insert 142 includes an inner surface 148, a first surface 154 and a second surface 156. The first surface 154 may define a first slot 158 and the second surface 156 may define a second slot 160. The first slot 158 may be diametrically opposite to the second slot 160 on the first insert 142. Further, the first slot 158 and the second slot 160 may have the same axis 159 (i.e. the axis 159 passes through the center of both the first slot 158 and the second slot 160, as shown in FIG. 6).

The first surface 154 may also define a first circumferential seat 162 and the second surface 156 may define a second circumferential seat 164. The first circumferential seat 162 and the second circumferential seat 164 may be defined as a portion of the first insert 142 that extend radially inward relative to the axis 159. The first insert 142 may further include an external surface 152. The external surface 152 of the first insert 142 may define a stepped portion 166 at the second end 146.

Figure 7:
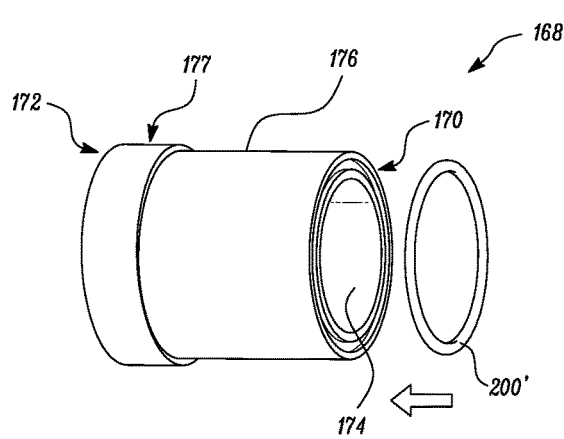

Referring to FIG. 7, the second insert 168 is disclosed. The second insert 168 may be a hollow elongated structure. In the embodiment illustrated in FIG. 7, the second insert 168 is a hollow cylindrical structure. The second insert 168 may be composed of stainless steel, Inconel®, Incoloy®, and/or other metal and alloys exhibiting suitable corrosion and erosion resistance and strength. If desired, coatings and surface treatments may be applied to the surfaces of the second insert 168 to improve the corrosion and erosion characteristics thereof. The second insert 168 may be sized/fabricated such that an internal profile of the second insert 168 is equivalent to an internal profile of the second bore 128 in an undamaged condition (as can be seen by comparing FIG. 3 and FIG. 16).

The second insert 168 has a first end 170 and a second end 172. The second insert 168 further has an internal surface 174 and an external surface 176. In an embodiment, the external surface 176 may define a stepped portion 177 at the second end 172.

Figure 8:
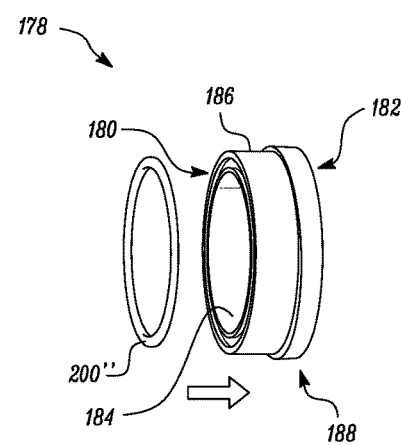

Referring to FIG. 8, the third insert 178 is disclosed. The third insert 178 may be a hollow elongated structure. In the embodiment illustrated in FIG. 8, the third insert 178 is a hollow cylindrical structure. The third insert 178 may be composed of stainless steel, Inconel®, and Incoloy®, and/or other metal and alloys exhibiting suitable corrosion and erosion resistance and strength. If desired, coatings and surface treatments may be applied to the surfaces of the third insert 178 to improve the corrosion and erosion characteristics thereof. The third insert 178 may be fabricated/sized such that an internal profile of the third insert 178 is similar to an internal profile of the third bore 130 in an undamaged condition (the similar profiles can be seen by comparing FIG. 8 and FIG. 16).

The third insert 178 also has a first end 180 and a second end 182. The third insert 178 further includes an internal surface 184 and an external surface 186. In an embodiment, the external surface 186 may define a stepped portion 188 at the second end 182.

INDUSTRIAL APPLICABILITY

In an aspect of the present disclosure, a method/process for remanufacturing the fluid end block 104 using the component set 135, is illustrated in FIG. 9-FIG. 27. The process of remanufacturing the fluid end block 104 includes enlarging the first bore 126 to a predetermined dimension (see FIG. 9), the second bore 128 to a second predetermined dimension (see FIG. 10), and the third bore 130 to a third predetermined dimension (see FIG. 11).

The first bore 126, the second bore 128, and the third bore 130, may be enlarged via a machining process (i.e. the process configured to remove material). In the embodiment illustrated in FIG. 9, FIG. 10 and FIG. 11, the machining process is a drilling process (utilizing a drilling tool 189) that enlarges the first bore 126, the second bore 128, the third bore 130, and the fourth bore 132. However, in various other embodiments, one or more of other process such as, but not limited to, boring, reaming, milling, may be implemented as a machining process.

In an embodiment, the first predetermined dimension, second predetermined dimension, and third predetermined dimension may correspond to radius or diameter of a desired bore. In an embodiment, the first predetermined dimension, second predetermined dimension, and third predetermined dimension may be determined based on the evaluation of the fluid end block 104. In an embodiment, the evaluation may correspond to an operator inserting a probe into the fluid end block 104 and inspecting the images provided by the probe and/or inspecting the fluid end block 104 visually and physically for damage. The evaluation of the fluid end block 104 may provide data pertaining to the eroded surfaces and the crack 150 (illustrated in FIG. 4). For example, the evaluation may provide data regarding the damage to the internal surfaces, the dimensions of the crack 150, direction of the crack 150 and an extent to which the crack 150 penetrates into the fluid end block 104. The first predetermined dimension, second predetermined dimension, and third predetermined dimension may be determined based on the data pertaining to the eroded surfaces and the crack 150 such that when the first bore 126, the second bore 128 and the third bore 130 are enlarged, the crack 150, defective surfaces/portion of the fluid end block 104 are removed.

Figure 9:
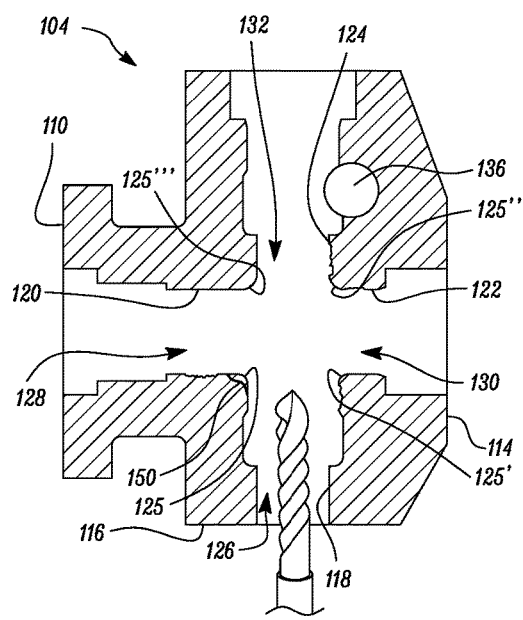
FIG. 9, FIG. 10, and FIG. 11 illustrate machining of the fluid end block (illustrated in FIG. 4) to remove the damaged portion, in accordance with an embodiment of the present disclosure.
Figure 10:
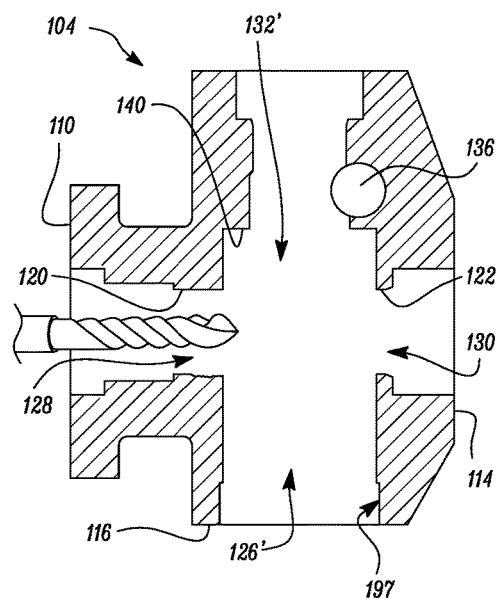
Figure 11:
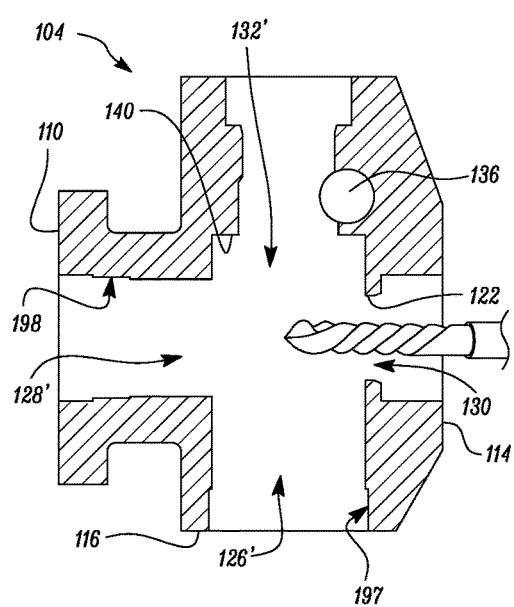

In the embodiment illustrated, during machining of the first bore 126, a portion of the fourth bore 132 is also enlarged to the first predetermined dimension such that a seat 140 is formed, as shown in FIG. 9 and FIG. 10.

Figure 12:
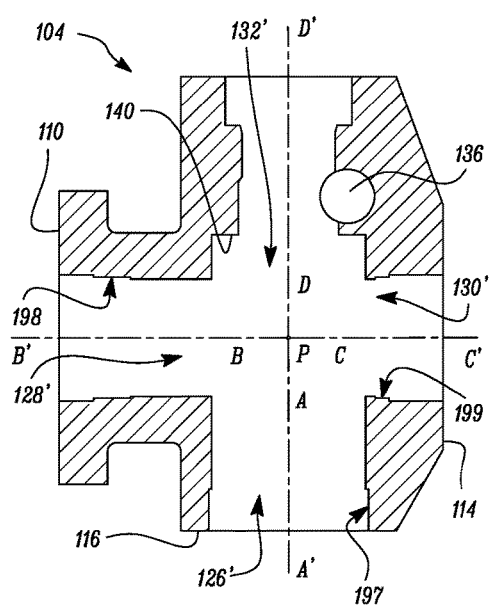
FIG. 12 illustrates the machined fluid end block having enlarged bores and no damaged portion, in accordance with an embodiment of the present disclosure.
Figure 13:
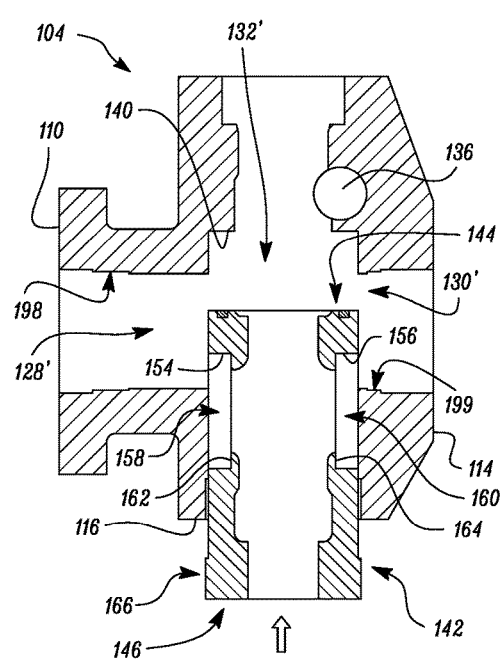
FIG. 13, FIG. 14, FIG. 15 and FIG. 16 illustrate the first insert, second insert and third insert being placed within the fluid end block, in accordance with an embodiment of the present disclosure.
Figure 14:
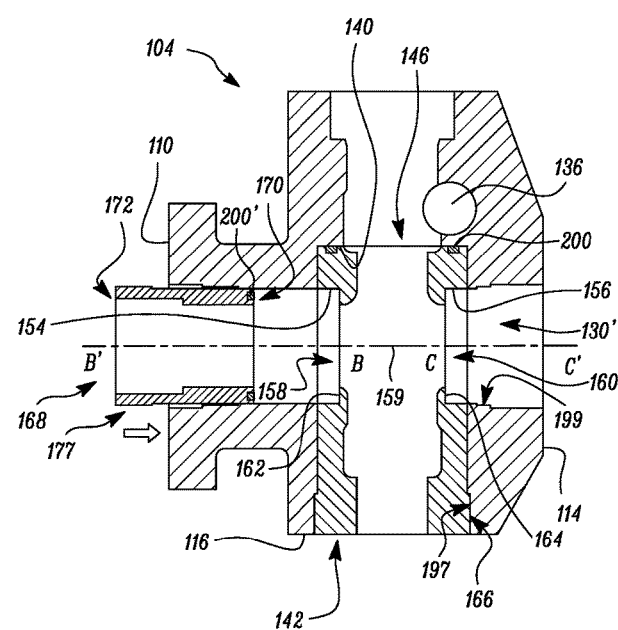

FIG. 12 illustrates the bores (126, 128, and 130) after the machining process has been implemented to enlarge the bores i.e. shows the enlarged first bore 126', enlarged second bore 128', enlarged third bore 130' and portion of the enlarged fourth bore 132'. The first insert 142 is now inserted within the enlarged first bore 126', as shown in FIG. 13 and FIG. 14. Subsequently, the first insert 142 is coupled to the fluid end block 104. The first insert 142 may be sized in a manner that an external diameter of the first insert 142 is either equivalent to or more than the diameter of enlarged first bore 126'. When such first insert 142 is assembled into the enlarged first bore 126' a snug-fit/press-fit is be achieved.

The first insert 142 is inserted in the enlarged first bore 126' such that the first end 144 of the first insert 142 abuts the seat 140 formed in the portion of the enlarged fourth bore 132', as shown in FIG. 14. In the embodiment illustrated, the first insert 142 is inserted into the enlarged first bore 126' in such a manner that the axis 159 (of the first slot 158 and the second slot 160) aligns with the longitudinal axis B-B' and C-C' (of the enlarged second bore 128' and the enlarged third bore 130'), as shown in FIG. 14. Further, the first insert 142 may be sized such that a diameter $D_{s1}$ of the first slot 158 is equal to the diameter of the enlarged second bore 128' and a diameter $D_{s2}$ of the second slot 160 is equal to the diameter of the enlarged third bore 130', as can be clearly seen in FIG. 14.

Figure 15:
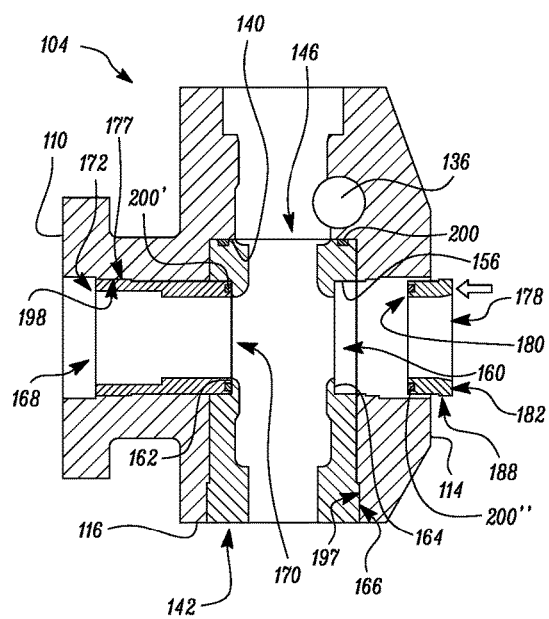

Subsequent to the insertion of the first insert 142, in the manner disclosed above, the second insert 168 is inserted into the enlarged second bore 128' such that the second insert 168 is at least partially received within the first slot 158, as shown in FIG. 14 and FIG. 15. The second insert 168 may be sized in a manner that an external diameter of the second insert 168 is either equivalent to or more than the diameter of enlarged second bore 128'. When the second insert 168 is inserted into the enlarged second bore 128' a snug-fit/press-fit may be achieved. In the embodiment illustrated, insertion of the second insert 168 in the enlarged second bore 128' also causes the second insert 168 to abut the first circumferential seat 162 of the first insert 142.

Figure 16:
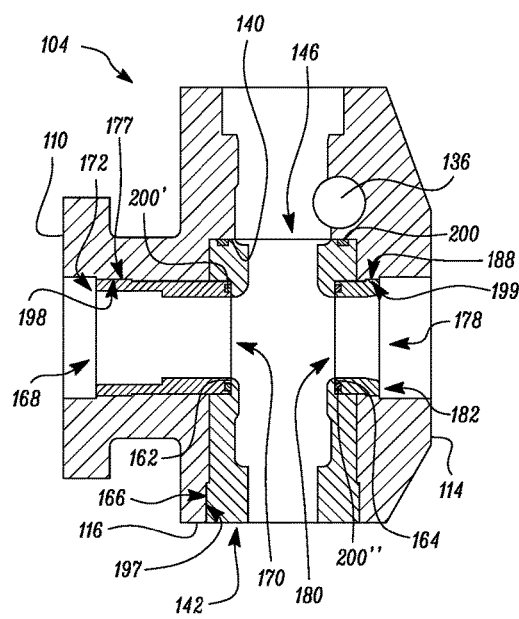
Figure 17:
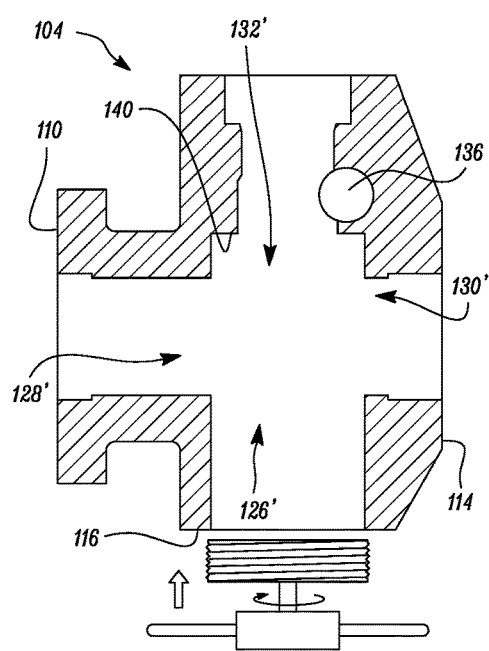
FIG. 17, FIG. 18, FIG. 19 and FIG. 20 illustrate forming internal threads in the fluid end block, in accordance with an embodiment of the present disclosure.
Figure 18:
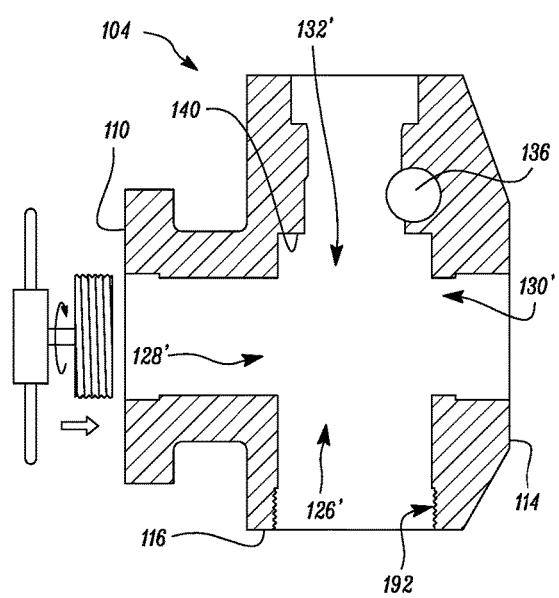
Figure 19:
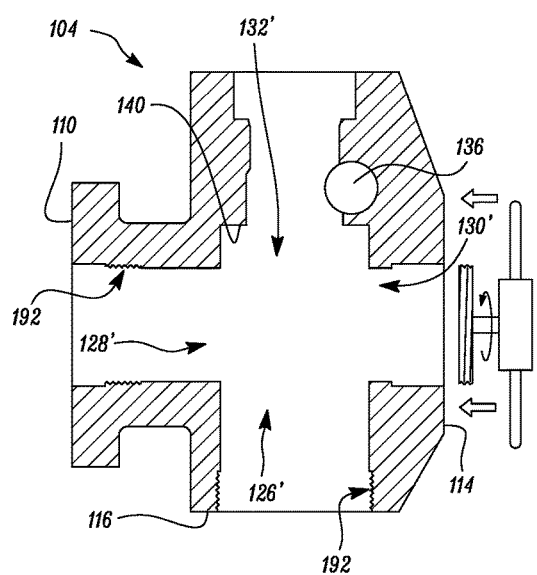
Figure 20:
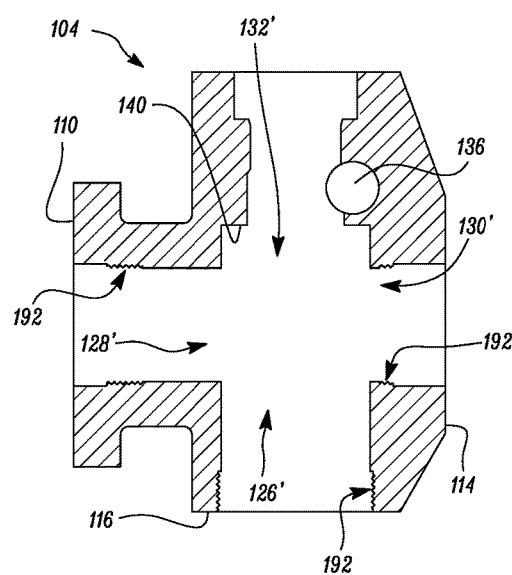
Figures 21, 22, 23:
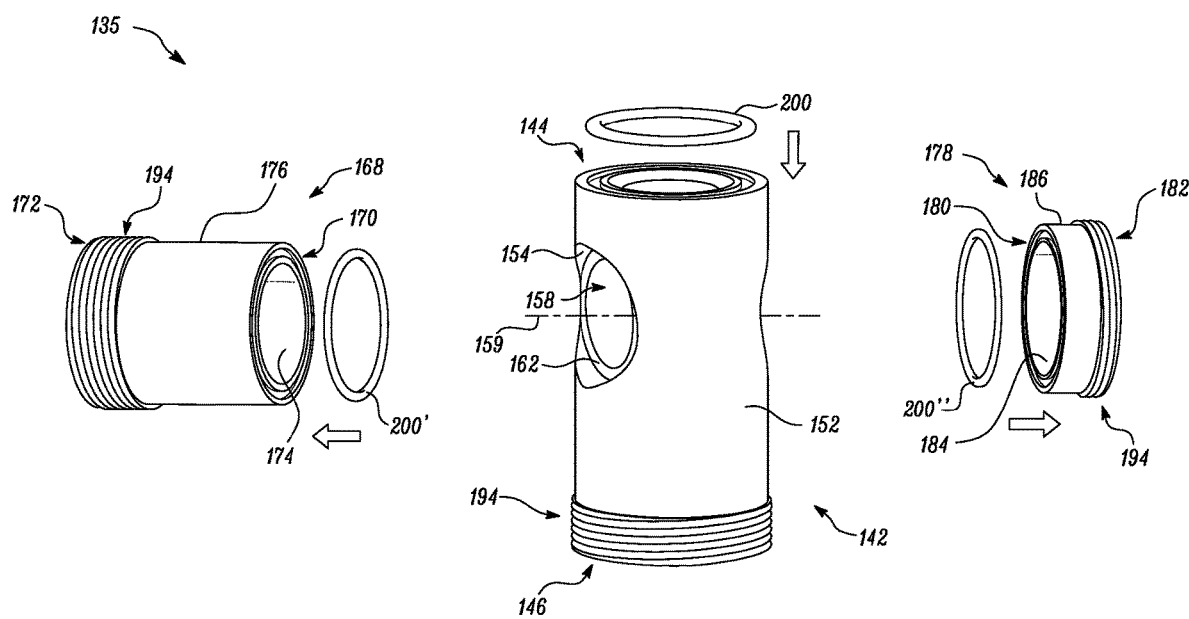
FIG. 21, FIG. 22 and FIG. 23 illustrate the first insert, the second insert and the third insert configured to be placed in the fluid end block, in accordance with an embodiment of the present disclosure.
Figure 24:
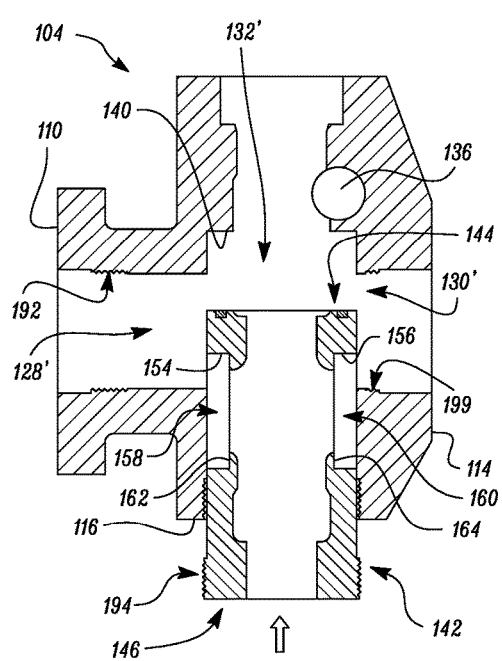
FIG. 24, FIG. 25, FIG. 26 and FIG. 27 illustrate the first insert, second insert and third insert (illustrated in FIG. 21, FIG. 22 and FIG. 23) being placed within the fluid end block, in accordance with an embodiment of the present disclosure.
Figure 25:
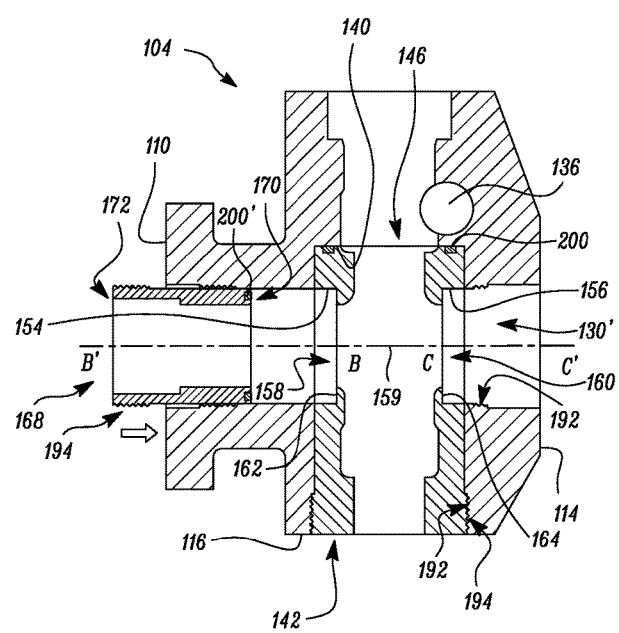
Figure 26:
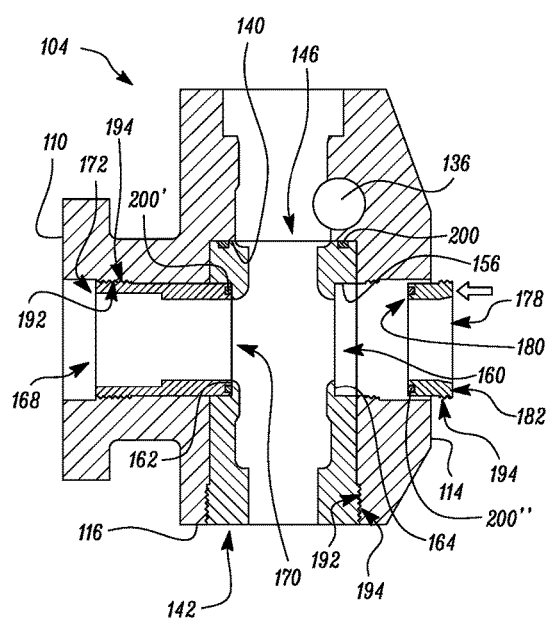
Figure 27:
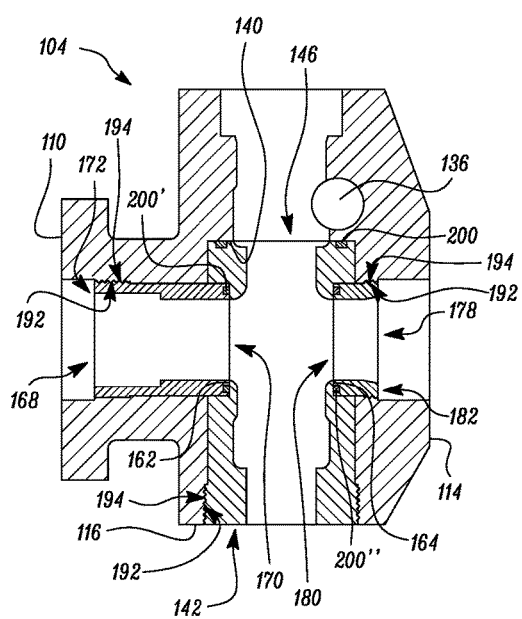

After inserting the second insert 168 into the enlarged second bore 128', the third insert 178 is inserted into the enlarged third bore 130' such that the third insert 178 is at least partially received within the second slot 160, as shown in FIG. 15 and FIG. 16. In the embodiment illustrated, the third insert 178 is inserted in the enlarged third bore 130' such that the third insert 178 abuts the second circumferential seat 164 of the first insert 142.

In an embodiment, after inserting the first insert 142, the second insert 168 and the third insert 178 into the enlarged first bore 126', the enlarged second bore 128' and the enlarged third bore 130' respectively, one or more of the first insert 142, the second insert 168 and the third insert 178 may be coupled with the fluid end block 104 by use of welds, as shown in FIG. 16. In the exemplary embodiment, welds have been shown to couple the second insert 168 and the third insert 178 to the fluid end block 104. However, it may be contemplated that in various other embodiments, the welds may also be used to couple the first insert 142 to the fluid end block 104.

The welds may be produced by a welding process that may be one of oxy-fuel welding, shielded metal arc welding (SMAW), gas tungsten arc welding (GTAW), gas metal arc welding (GMAW), flux-cored arc welding (FCAW), submerged arc welding (SAW), electro-slag welding (ESW) and electric resistance welding (ERW).

In an alternate embodiment, one or more of the first insert 142, the second insert 168 and the third insert 178 may be coupled with the fluid end block 104 by use of stitch pins. In the exemplary embodiment illustrated in FIG. 16, only the first insert 142 has been coupled to the fluid end block 104 via use of stitch pins. However, in various other embodiments, the stitch pins may be used to couple the second insert 168 and the third insert 178 to the fluid end block 104. In one embodiment a portion of the stich pins may be removed by machining or the like so the stich pins are flush with respect to the second block surface 116.

In yet another embodiment, one or more of the first insert 142, the second insert 168 and the third insert 178 may be coupled with the fluid end block 104 by use of industrial adhesives or other methods known in the art.

In an embodiment, the step of enlarging the bores may also include forming stepped portion 197, 198 and 199 in the enlarged first bore 126', enlarged second bore 128' and the enlarged third bore 130' respectively, as illustrated in FIG. 9, FIG. 10, FIG. 11 and FIG. 12. The stepped portion 197, 198 and 199 may be complementary to the stepped portion 166, 177 and 188 (of the first insert 142, second insert 168 and the third insert 178) respectively. In such enlarged bores, when the first insert 142, second insert 168 and the third insert 178 are inserted, the stepped portion 197, 198 and 199 engage with the stepped portion 166, 177 and 188 of the first insert 142, second insert 168 and the third insert 178, respectively, and align the inserts within the bores, as illustrated in FIG. 16.

In an embodiment, the process of remanufacturing the fluid end block 104 may also include placing a metal seal 200 on the first end 144 of the first insert 142 prior to inserting the first insert 142 into the enlarged first bore 126', as shown in FIG. 5. When the first insert 142 with the metal seal 200 disposed on the first end 144 is inserted into the enlarged first bore 126', the metal seal 200 gets sandwiched between the first insert 142 and the seat 140 formed in the enlarged fourth bore 132', as shown in FIG. 16. The process of remanufacturing the fluid end block 104 may further include placing a metal seal 200' similar to the metal seal 200 on the first end 170 of the second insert 168 prior to being inserted into the enlarged second bore 128', as shown in FIG. 7. When this second insert 168 is inserted in the enlarged second bore 128', the metal seal 200' gets sandwiched between the second insert 168 and the first circumferential seat 162 of the first insert 142, as shown in FIG. 16. Furthermore, the process of remanufacturing the fluid end block 104 may further include placing a metal seal 200" on the first end 180 of the third insert 178 prior to being inserted into the enlarged third bore 130', as shown in FIG. 8. Thus, when the third insert 178 is inserted in the enlarged third bore 130' the metal seal 200" gets sandwiched between the second circumferential seat 164 of the first insert 142 and the first end 180 of the third insert 178, as shown in FIG. 16. The metal seals 200, 200' and 200" may be formed from a suitable material which can withstand the high pressures and chemical erosion associated with fracking operations. The metal seals 200, 200' and 200" may include elastomers and synthetic fluorocarbon polymers that exhibit corrosion resistance properties.

In an embodiment, the process of remanufacturing the fluid end block 104 may further include forming threads in the first bore 126, second bore 128, third bore 130, as shown in FIG. 17-FIG. 20. For example, after enlarging the first bore 126, second bore 128, third bore 130 to the first predetermined dimension, second predetermined dimension, and the third predetermined dimension, respectively, internal threads 192 may be formed in the enlarged first bore 126', enlarged second bore 128' and enlarged third bore 130'. External threads 194 are complementary to the internal threads 192 present on the first insert 142 (i.e. on the external surface 152), second insert 168 (i.e. on the external surface 176) and third insert 178 (i.e. on the external surface 186). In such an arrangement, the first insert 142 may be inserted into the enlarged first bore 126' and may be threadably coupled to the fluid end block 104 by engaging the internal threads 192 in the enlarged first bore 126' with the external threads 194 on the first insert 142. Similarly, the second insert 168 and the third insert 178 may be threadably coupled to the fluid end block 104 by engaging the internal threads 192 in the enlarged second bore 128' and enlarged third bore 130' with the external threads 194 on the second insert 168 and third insert 178, respectively. Such configurations may facilitate easy removal of the first insert 142, the second insert 168 and the third insert 178 in case cleaning or replacement of the first insert 142, the second insert 168 and/or the third insert 178 is necessitated.

The process of remanufacturing the fluid end block 104 disclosed above thus facilitates remanufacturing the fluid end block 104 in an easy and efficient manner. Further, the process of remanufacturing the fluid end block 104 yields a fluid end block that has the same dimensional configurations as the original undamaged fluid end block 104 had (as the inserts have internal profiles and surface structures that are similar to the diameters of the bores in an undamaged condition). Accordingly, the same plungers may be used. This prevents the need for new parts to operate the well stimulation pump 100. Further, the ability to remanufacture the fluid end block 104 obviates the need to replace the damaged fluid end block with a new fluid end block. Further, the process of remanufacturing the fluid end block 104 includes steps that can be easily and quickly implemented.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for remanufacturing a fluid end block of a pump, the fluid end block including a first bore defining a first longitudinal axis, a second bore defining a second longitudinal axis, and a third bore defining a third longitudinal axis, the method comprising:

enlarging, by a machining process, the first bore to a first predetermined dimension, the second bore to a second predetermined dimension, and the third bore to a third predetermined dimension;

inserting a first insert into the enlarged first bore and coupling the first insert to the fluid end block, the first insert being an elongated hollow structure having a first surface and a second surface, the first surface defining a first slot, and the second surface defining a second slot, the first surface further defining a first circumferential seat and the second surface further defining a second circumferential seat, the first circumferential seat facing away from the first longitudinal axis along a radial direction, the second circumferential seat facing away from the first circumferential seat along the radial direction;

inserting a second insert into the enlarged second bore such that an end of the second insert is at least partially received within the first slot and abuts the first circumferential seat; and inserting a third insert into the enlarged third bore such that an end of the third insert is at least partially received within the second slot and abuts the second circumferential seat, the end of the second insert facing the end of the third insert along the radial direction, wherein an inner surface of the first insert and an outer surface of the first insert define a thickness of the first insert therebetween, the first circumferential seat is disposed between the inner surface of the first insert and the outer surface of the first insert along the radial direction, and the second circumferential seat is disposed between the inner surface of the first insert and the outer surface of the first insert along the radial direction.

2. The method of claim 1, wherein the fluid end block of the pump further includes a fourth bore defining a fourth axis, the method further comprising:

enlarging the fourth bore to the first predetermined dimension to form a seat for an end of the first insert.

3. The method of claim 2, wherein the first insert is inserted into the enlarged first bore and coupled to the fluid end block such that:

the first insert is at least partially inserted in the fourth bore, and the end of the first insert abuts the seat formed in the fourth bore.

4. The method of claim 1, wherein enlarging the first bore, the second bore and the third bore to the first predetermined dimension, the second predetermined dimension and the third predetermined dimension respectively includes removal of a damaged portion of the fluid end block.

5. The method of claim 1, further comprising placing a metal seal at each of an end of the first insert, the end of the second insert and the end of the third insert.

6. The method of claim 1, wherein the first insert, the second insert, and the third insert are threadably coupled to the fluid end block.

7. The method of claim 1, wherein the first insert is a hollow cylindrical structure, and the first slot is located diametrically opposite to the second slot on the first insert.

* * * * *